Figure 1:
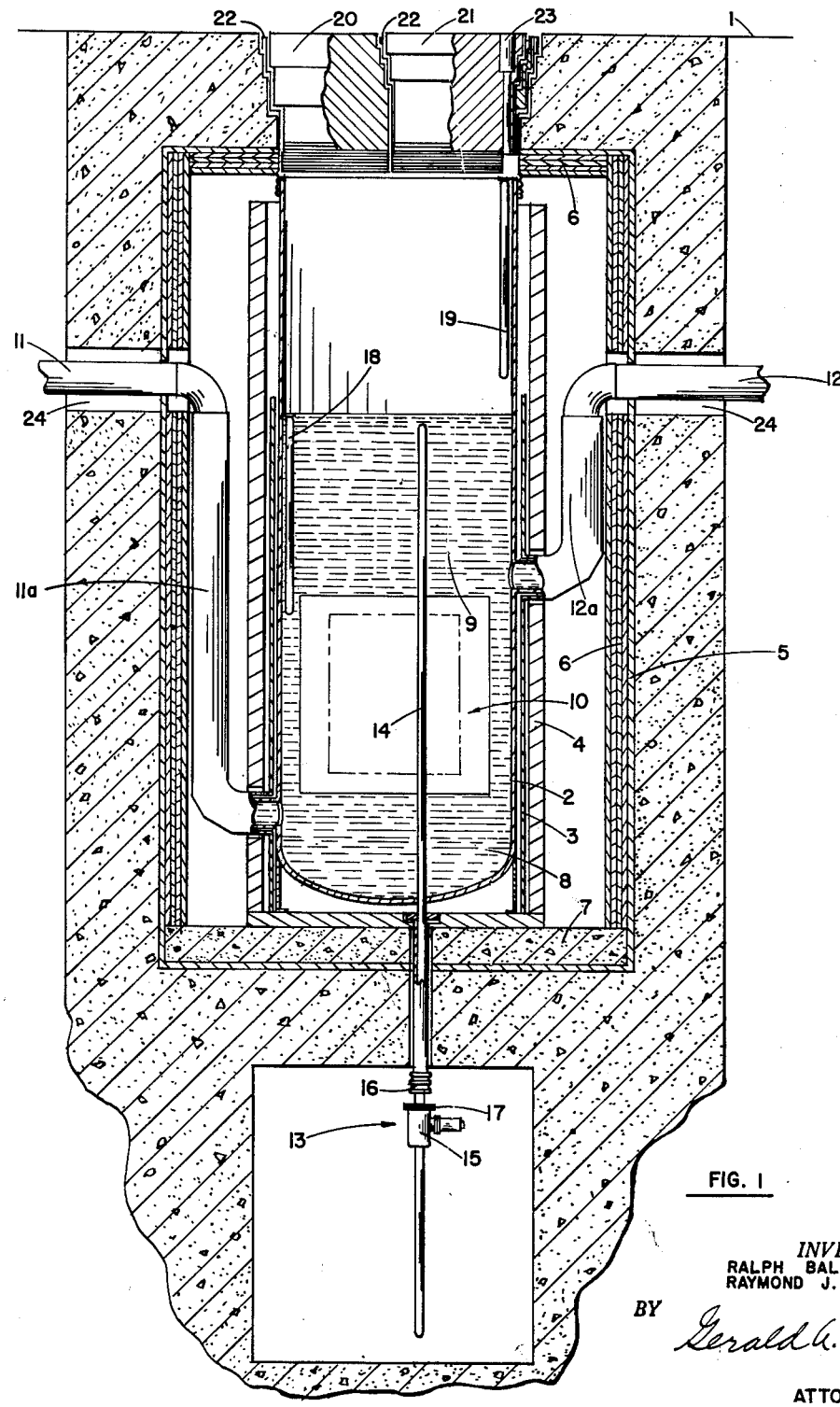

July 27, 1965  R. BALENT ETAL  3,197,376
EPITHERMAL THORIUM POWER-BREEDER NUCLEAR REACTOR
Original Filed April 22, 1957  5 Sheets-Sheet 1

INVENTORS
RALPH BALENT
RAYMOND J. BEELEY
BY
Gerald A. Koris
ATTORNEY

INVENTORS
RALPH BALENT
RAYMOND J. BEELEY

July 27, 1965 R. BALENT ETAL 3,197,376
EPITHERMAL THORIUM POWER-BREEDER NUCLEAR REACTOR
Original Filed April 22, 1957 5 Sheets-Sheet 3

INVENTOR.
RALPH BALENT
RAYMOND J. BEELEY
BY
ATTORNEY

July 27, 1965

R. BALENT ETAL 3,197,376

EPITHERMAL THORIUM POWER-BREEDER NUCLEAR REACTOR

Original Filed April 22, 1957

5 Sheets-Sheet 4

FIG. 7

INVENTOR.
RALPH BALENT
RAYMOND J. BEELEY
BY
*Gerald A. Koris*

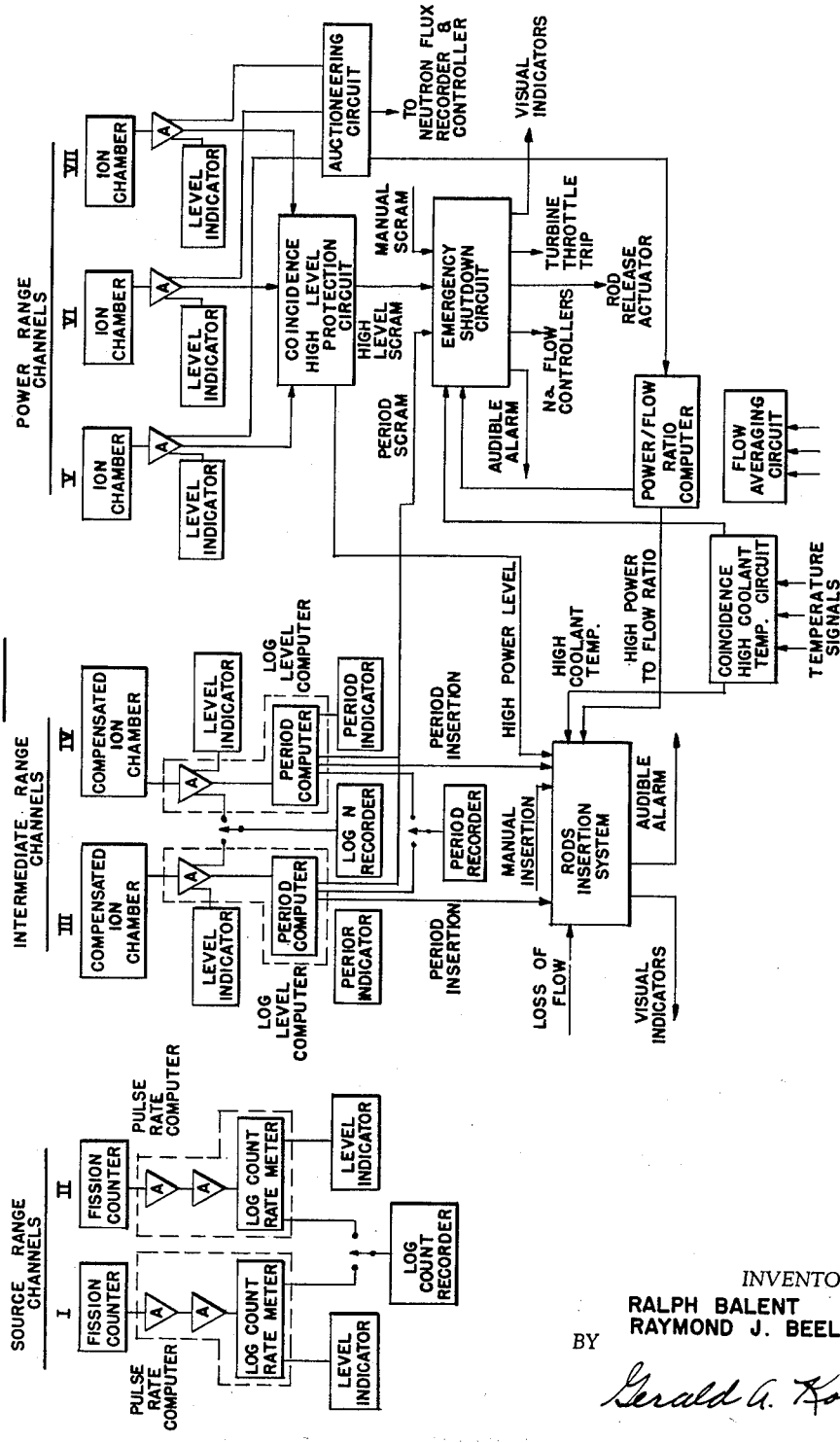

ns Patent Office
3,197,376
Patented July 27, 1965

3,197,376
EPITHERMAL THORIUM POWER-BREEDER
NUCLEAR REACTOR
Ralph Balent, Tarzana, and Raymond J. Beeley, Woodland Hills, Calif., assignors to North American Aviation, Inc.
Continuation of application Ser. No. 654,187, Apr. 22, 1957. This application Dec. 16, 1960, Ser. No. 76,423
4 Claims. (Cl. 176—18)

The present application is a continuation of our prior application Serial No. 654,187 filed April 22, 1957, now abandoned.

Our invention relates to an improved breeder reactor, and more particularly to a thorium power-breeder reactor utilizing an epithermal neutron spectrum.

For information concerning the theory, construction, and operation of nuclear reactors, reference is made to U.S. Patents 2,708,656 and 2,714,577 to Fermi et al.; Glasstone, Principles of Nuclear Reactor Engineering, (D. Van Nostrand Co.); Schultz, The Control of Nuclear Reactors, (McGraw-Hill); The Reactor Handbook (3 volumes), published by the U.S. Atomic Energy Commission; and to The Proceedings of the International Conference on the Peaceful Uses of Atomic Energy, held in Geneva, Switzerland, August 1955, and available for sale at the United Nations' Book Store, New York, New York.

For particular information of reactors using sodium as a coolant, reference is made to the Geneva Conference papers of W. E. Parkins, "The Sodium Reactor Experiment," and Chauncey Starr, "A Sodium Graphite Reactor 75,000 Electrical Kilowatt Power Plant."

Unless otherwise noted, standard nuclear terminology will be used herein. For example, "fissile material" refers to plutonium-239, uranium-235, and uranium-233, and "fertile material" refers to thorium and uranium-238, which may be converted to fissile species through neutron capture followed by beta decay. When uranium, thorium, or plutonium is spoken of, this embraces both the metal, refractory oxides, such as $ThO_2$ and $UO_2$, ceramics such as the carbide and nitride, alloys such as Th-U, and metal-metal oxide mixtures. The "intermediate" or "epithermal" portion of the neutron energy spectrum embraces neutrons having an energy of approximately 1 ev.–100,000 ev.

In the development of economically competitive nuclear power, particular attention is being given to the conversion or breeding of new fissile species from material not fissile in its natural form. Since the supply of U-235 is limited, widespread use of nuclear power requires the conversion of relatively abundant thorium to uranium-233 and of uranium-238 to plutonium-239. The resulting uranium-233 and plutonium-239 can then be used for the further conversion of fertile material; thus, the potential exists for actually increasing the amount of fissile material while, at the same time, extracting useful power. Although it is advantageous to have a conversion ratio C of 1.0 or greater, since this would decrease dependence upon outside sources of fissile material, a reactor approaching this value may still be very successful.

While a thermal breeder using the Th-$U^{233}$ cycle is possible, the materials of construction will be severely limited and a high conversion ratio is difficult to achieve. For instance, in the thermal Sodium Graphite Reactor described above, the predicted breeding ratio is only about 0.8.

Another breeder reactor system being developed is a fast reactor using the uranium-plutonium cycle. A fast reactor has the advantage that absorption of neutrons by reactor structural material and fission products is reduced because neutron absorption cross sections generally decrease with neutron energy; xenon override is not a problem as in thermal reactors. Many severe developmental problems must be overcome with a fast plutonium breeder, including heat removal from a core which must necessarily be compact to achieve a chain fission reaction, and control of the reactor with its short neutron lifetime. The attainment of high specific power from such a core without degrading the energy spectrum with the sodium coolant remains a serious obstacle to the fast breeder reactor (sodium is used with compact cores because of its excellent heat transfer characteristics). It is well appreciated that control of the neutron energy spectrum is achieved through the proper balance of moderator material with the fuel; thus, a fast reactor would employ no moderator while a thermal reactor would use sufficient moderator to reduce the neutron spectrum to an average energy in thermal equilibrium with its environment, that is, to an energy of approximately 0.025 ev. in a moderator at room temperature.

It can be seen from this discussion that a highly desirable reactor type would be one which permits use of structural material without regard to cross section, as in a fast reactor, and maintains the economic advantages of successful breeding. It would be highly advantageous if the core size were such as to allow efficient heat removal and the neutron energy spectrum such as to permit efficient reactor control. A reactor of this sort would be a significant step in reducing the unit cost of power generation from nuclear fission.

In view of these considerations, an object of our present invention is to provide an improved power-breeder reactor.

Another object is to provide a power-breeder reactor which avoids the control and heat withdrawal problems of the fast reactor and yet permits use of structural material having high neutron absorption cross sections in the thermal region.

Another object is to provide an epithermal breeder reactor.

Still another object is to provide an epithermal thorium power-breeder reactor.

Still another object is to provide such a reactor which has a high eta and low alpha in the epithermal region.

Yet another object is to provide such a reactor which has a high power density and permits use of metallurgically sound structural material.

Yet another object is to provide such a reactor which avoids the need for large amounts of excess reactivity to compensate for xenon poisoning during normal operation or for start-up after shutdown.

Further objects and advantages of our invention will become apparent from the following detailed description taken together with the attached drawings and appended claims.

Figure 2:
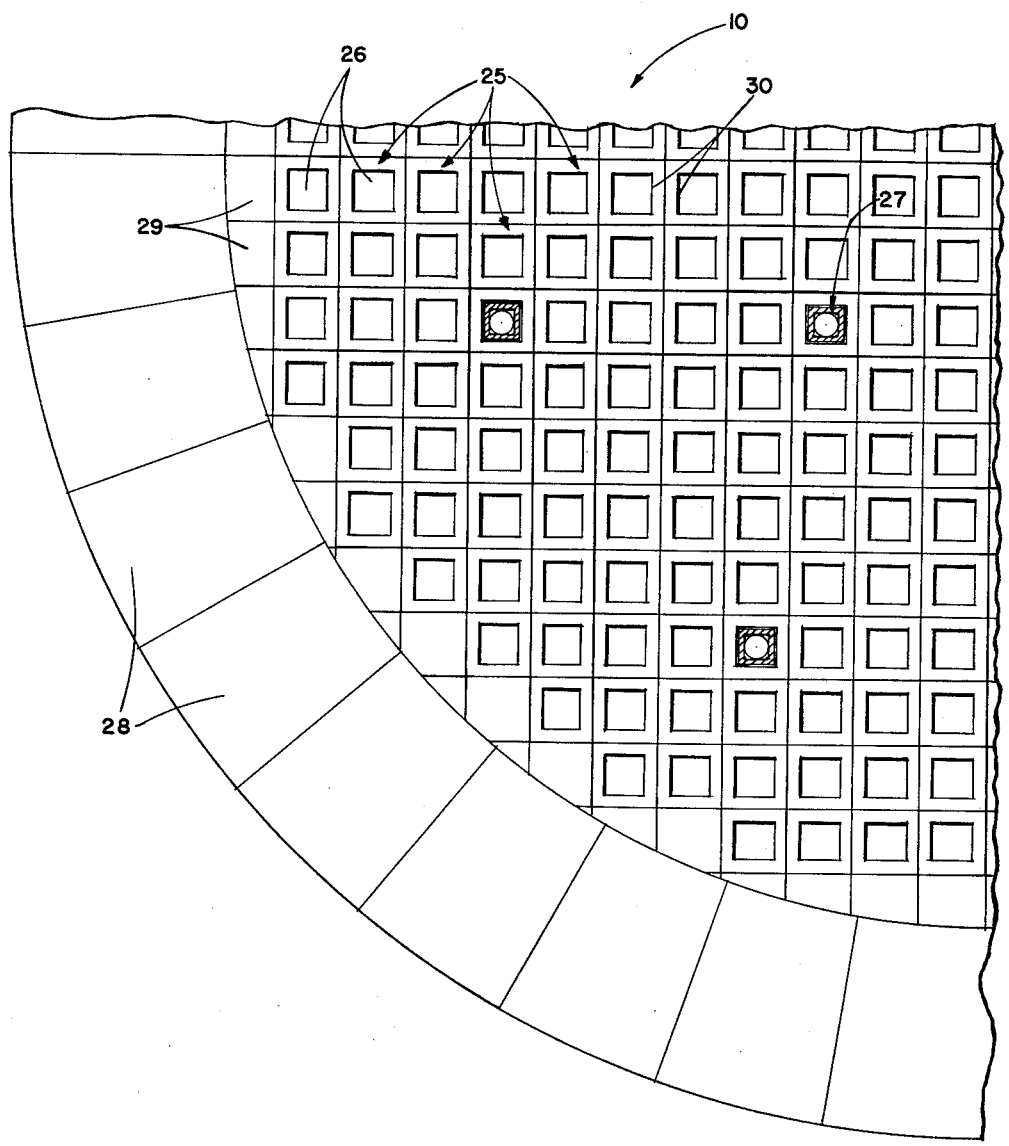
Figure 4:
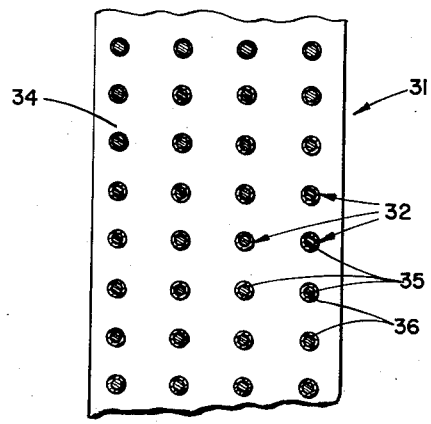
Figure 5:
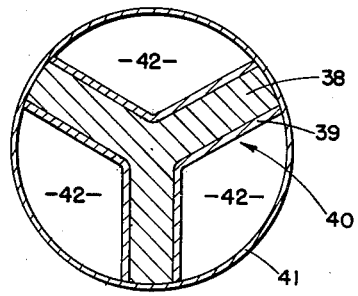
Figure 6:
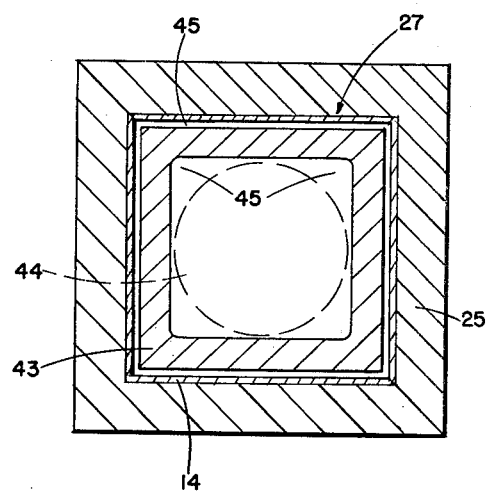
Figure 3:
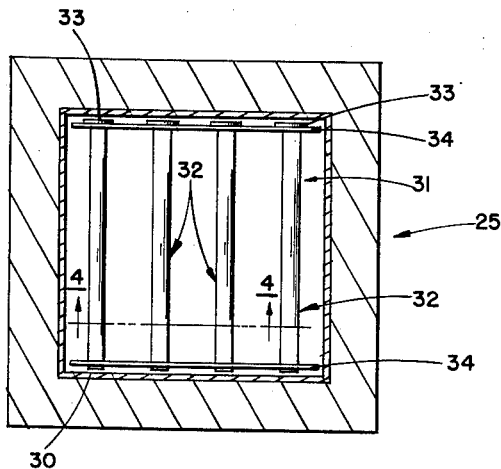

In the drawings, FIG. 1 is a reactor elevation; FIG. 2 is an enlarged partial cross section of the reactor core; FIG. 3 is an enlarged portion of FIG. 2 showing one individual unit cell of the core together with one suitable fuel element; FIG. 4 is a section of this fuel element; FIG. 5 is a section of another suitable fuel element; FIG. 6 is an enlarged portion of FIG. 2 showing one control element; FIG. 7 is a schematic flow diagram; and FIG. 8 is an overall instrumentation block diagram.

Essentially this invention provides an epithermal thorium power-breeder reactor. The basis for the invention is the finding that the neutron economy of the intermediate thorium-$U^{233}$ cycle is excellent. Thus, in the region between 0.1 ev. to 10 mev., it is found that eta ($\eta$—average number of neutrons liberated per neutron absorbed in fuel) for U-233 is fairly constant with energy and actually has no preferred energy range. At the same time, however, the cross sections for most poisons rapidly diminish with energy. Although the eta for U-233 would permit operation in the fast region, operation in the epithermal region permits easier heat removal and diminishes control problems. For efficient heat removal a molten inorganic medium, such as a liquid metal, alloy, or fused alkali fluoride salt, with their high heat transfer characteristics and low vapor pressure would be used. Sodium is the preferred molten medium. However, hydrocarbon or aqueous coolants may also be used if only a small amount is present in the core. The necessary amount of moderation would be supplied by graphite, beryllium, hydrogen or deuterium, and compounds and alloys thereof, or other acceptable moderators. Since sodium is a relatively light element which degrades the neutron energy spectrum, the provision of relatively large amounts of sodium in the core, pumped at a relatively slow rate, can obtain the desired epithermal spectrum without the use of separate moderator. The fuel would be thorium-based, which permits higher fuel temperatures with correspondingly increased heat fluxes, specific powers and longer fuel element life. The fuel cycle is thorium to U-233, with U-233 as the fissile fuel, although U-235 could be used for initial start-up. The intermediate thorium breeder (ETB), as compared with a thermal thorium breeder, would have a smaller, more compact core resulting in less moderator (or none with sufficient sodium), reduced thermal and biological shielding and smaller tanks. The economies achieved with the smaller size would be noteworthy. Considerable excess reactivity would not be necessary to overcome problems associated with xenon during reactor start-up or from override. Separate thorium blankets may be provided around the active core to promote efficient breeding. Such a blanket would have available the rather high number of neutrons leaking from an epithermal core. Without a separate blanket, the breeding ratio would not be as high.

The concept outlined above in general terms is not restricted to any particular core design or component thereof. The concept is valid for different core designs using different moderators, fuel elements and coolants, and is also applicable to homogeneous as well as heterogeneous systems. For example, the Sodium Graphite Reactor core, described in the above Geneva Conference papers, may be used for this application by reducing the amount of graphite in the core to reach an epithermal from a thermal neutron spectrum, by the use of thorium-uranium fuel elements of the sort indicated in the paper by Chauncey Starr describing thorium-U$^{233}$ in a thermal sodium graphite reactor, and by the possible use of a thorium blanket. Therefore, the following detailed discussion describing a particular reactor configuration should be understood as only illustrative and not restrictive of our basic concept which is inherently broad and which may be obtained with other core configurations.

Refering now to FIG. 1, we see the overall sectional view of the reactor. The entire system is positioned below ground level 1 embedded in concrete. The core 10 is contained in a steel core tank 2, surrounding which is a secondary container 3 to hold coolant in case of rupture of tank 2. This assembly is surounded by thermal shield 4. A core cavity liner 5 surrounds the reactor and is provided with thermal insulation 6 on its sides and top and with concrete 7 at its bottom as a base for the reactor. There are sodium plenum chambers 8 and 9 below and above reactor core 10. The sodium coolant inlet line 11 passes to the bottom through the reactor supporting structure into bottom plenum 8. It then passes in a single upward pass through core 10 and passes out reactor outlet line 12. The coolant lines have double-walled portions 11a and 12a of a height equal to the level of sodium in core tank 2 to prevent any sodium leaks in lines 11 and 12. The top plenum 9 is to provide a thermal reservoir against sudden temperature changes and to prevent vortexing at outlet line 12. The control rod mechanism 13 is a bottom drive, and is positioned inside a thimble 14 passing through the core tank reactor core support into and above core 10. Its normal withdrawn position is above the core in top plenum 9, and is inserted by being lowered into the core. It is fail-safe in that in the event of a failure it will drop into the core. The drive mechanism 15 is conventional and may suitably be a worm gear or rack and pinion arrangement. A bellows 16 and connected tube constitute a continuation of the secondary container tank 3; the design is such as to avoid binding of the control rod when the reactor tank is heated and expands radially. The plate 17 indicates the joint between the control rod thimble and the drive mechanism. Spent fuel elements 18 may be stored in a rack in the sodium system to permit decay of short-lived fission products before withdrawal from the reactor. An auxiliary fuel rod 19 may similarly be stored in the reactor until needed. The top shield comprises outer 20 and inner 21 rotating plugs, the inner plug being eccentrically positioned. Sealing of these is accomplished with low-melting fusible alloys 22, such as of lead-bismuth, between the plugs. By rotation of plugs 20 and 21 after melting of seal 22, an access hole 23 can be indexed over any particular fuel channel for insertion or withdrawal of fuel elements in the reactor by means of a grappling hook or other suitable handling means. An inert gas atmosphere, such as helium, is supplied over all sodium surfaces and the region outside of the core tank and around the sodium piping 24 are provided with a non-oxidizing gas such as nitrogen.

In FIG. 2 we have a sectional quadrant of core 10. The core comprises a plurality of unit cells 25 with hollow, square-shaped central channel 26. The unit cell 25 is composed of the moderant, suitably graphite and preferably beryllium. By "beryllium" is meant both the metal and beryllia. The beryllium or other moderant comprises approximately 0 to 50% of the core volume, with approximately 20% being preferred in this design to achieve the epithermal spectrum. With approximately 20% of the core being beryllium, the mean fission energy will be approximately 100 ev. Control elements 27 occupy three of the unit cells instead of fuel elements, for a total of 12 control elements in the core. The reflector-blanket region 28 consists of a moderant, suitably graphite, and thorium for neutron absorption. The thorium could be in any form such as metal, salt, or solution; in this design the thorium is in metal rods clad in stainless steel and cooled with sodium (not shown). The thorium occupies approximately 10 volume percent of the blanket, although this percentage may satisfactorily vary. Beryllium inserts 29 fit between cells 25 and blanket 28. For high temperature operation (e.g. ~1100° F.), the beryllium may be provided with a thin cladding 30 (e.g., ~10 mil) of a corrosion resistant metal or alloy such as stainless steel, zirconium, inconel or titanium to protect it from the sodium coolant; stainless steel is preferred. At temperatures less than approximately 1000° F. cladding is not required.

In FIG. 3, we see an enlarged unit cell 25 containing a fuel element 31. This fuel element 31 is a pin-type element with a plurality of pins 32 positioned transversely to the longitudinal axis of element and held by end pieces 33 by welding or mechanical means on one side of frame 34, which consists of two side plates of the above corrosion resistant metals or alloys. The pins 32 are not fastened to frame 34 at their other end to allow for differential thermal expansion. The coolant flow is therefore of the closs-flow type, across the individual fuel pins. As seen in the section of FIG. 4, pins 32 comprise preferably a thorium-uranium alloy core 35, approximately 3–15 wt. percent uranium by weight, about 7% uranium being preferred, with a cladding of the corrosion resistant metal. Thorium and uranium oxides and ceramics may also be used in the fuel elements, for example a sintered compact of $UO_2$-$ThO_2$. As seen in FIG. 4, pins 32 are aligned in parallel rows. The coolant is cross-flowed over these pins. This type of fuel element will have a high specific power, and mechanical and metallurgical reliability.

In FIG. 5 we have another suitable fuel element. This comprises a thorium-uranium core 38 with a steel cladding 39 in the form of three equally spaced radial spokes 40 joining a cylindrical stainless steel frame 41. Using the same design principle, the fuel element may comprise a larger number of equally spaced, radially directed spokes. The sodium coolant flows in the channels 42 between spokes 40 and frame 41.

Still another suitable type of fuel element is a modified MTR-type element, that is, a plate-type element with parallel flat or bowed plates encased in a rectangular hollow frame. Composition of this element would be a thorium-uranium metal core with a cladding of stainless steel, the frame also being of stainless steel. For details concerning this familiar fuel element type, reference is made to the Geneva Conference paper of J. E. Cunningham and E. J. Boyle entitled, "MTR-Type Fuel Elements." Yet another fuel element that may be used is a cluster of thin Th-U rods, as shown in the above Geneva paper of Chauncey Starr.

FIG. 6 is an enlarged view of control elements 27 from FIG. 2. The neutron absorber 43 is square-shaped and held to a push tube 44 operating in thimble 14. Standard material of high neutron cross section may be used as the absorber material, such as boron, hafnium, lithium-7, gadolinium, europium, mixed rare earths and alloys, compounds, and mixtures thereof. Anuli 45 are inert gas filled. There are twelve elements in the core of which six are used as safety rods and six as control elements.

Reference is now made to FIG. 7, a schematic flow diagram which is essentially self explanatory. In this application, sodium is used as the liquid metal coolant, but other liquid metals such as lithium-7, sodium-potassium, other alkali metals, bismuth, bismuth-tin, and combinations thereof may also be used, as well as fused fluoride salts. Except as indicated, the heat exchange system is conventional and except as indicated follows that of the Sodium Reactor Experiment (SRE) supra, to which reference is made for further details. Essentially, the coolant system comprises five parallel heat exchange loops. For clarity the flow diagram shows but one. The inlet line in each loop enters the bottom plenum of the reactor, the coolant passes up flow in a single pass through the reactor and is withdrawn at the top through an intermediate heat exchanger. The secondary loop and the intermediate heat exchanger are necessary because the sodium becomes radioactive upon neutron irradiation and it is desired that the sodium in the steam generator portion be non-radioactive because some leakage is hard to prevent. The intermediate heat exchanger is a relatively simple, single-pass design as in the SRE and the heat is transferred sodium-to-sodium. The primary and secondary heat exchange loops have their own pumps which may be modified chemical pumps as in the SRE, electromagnetic pumps, or sump pumps. The sodium in the secondary loop passes through a super heater and into the steam generator. The heat transfer in the steam generator is sodium to an intermediate fluid, such as mercury, and then to water. The mercury is used because it is non-reactive with sodium or water in the event of a leak by either, while sodium and water yields an energetic reaction. Upon leaving the steam generator the cooled sodium returns through the secondary pump to the intermediate heat exchanger.

The primary sodium loop has a small lead and return line to a sodium purification system for the removal of sodium oxide. This is accomplished by precipitating sodium oxide out in a cold trap cooled by an organic fluid, such as toluene or tetralin. Details of the cold trap and plugging meter are found in the above paper on the SRE. Radioactive gases from the primary sodium purification system are taken to decay tanks for holdup to permit decay of short-lived fission gases, and then passed through a filter, such as of activated carbon, to a tall stack and the atmosphere. The secondary sodium purification system is similar except that the radioactive vent system is omitted. The other details of the heat exchange system are conventional and similar to other sodium systems as shown in the above Geneva Conference papers.

The instrumentation and control system employed is not critical and systems other than that shown in the block diagram, FIG. 8, may be used. The instrumentation is here divided into the usual three channels, the source range, intermediate range and power range. Fission counters are used in the source range, compensated ion chambers in the intermediate range and ion chambers in the power range. All the instrumentation such as the neutron detectors, amplifiers, rate meters, etc. are commercially available.

The nuclear instrumentation is designed to obtain maximum safety, reliability and to simplify operation and maintenance. The instrumentation covers the entire flux range at all times. The source range, containing conventional pulse rate computer equipment, covers a five decade range.

The intermediate range provides reactor period indication and protection as well as six decade flux level coverage.

Since the majority of the operating time will be in the power range, a three channel system has been selected for reliability and to minimize false shutdowns. The system requires two channels to trip in coincidence, thereby decreasing the probability of a false shutdown.

By utilizing an auctioneering circuit the highest signal from the power channels is fed to the automatic control circuitry.

The safety system is designed to operate in the following manner. If one or more abnormal conditions arise, the system will give a visual and audio alarm. If the conditions persist and are of a damaging nature, the control rods will be inserted. If this fails to correct the situation and the condition deviates beyond the insertion set point, the reactor will shut down by dropping the control and safety rods into the core.

The following signals can actuate the emergency shutdown system:

Fast period—This signal will be disconnected when the power level is above 3% of full power.

Manual scram.

Power to flow ratio comparator—The comparator's function will be to derive a signal comparing the highest reading of the power range channels to the total coolant flow. If the ratio exceeds a predetermined set point the reactor will shut down.

High coolant outlet temperature—The system requires two signals to trip in coincidence, thereby decreasing the probability of false shutdown.

High neutron flux—As previously mentioned the system requires two channels to trip in coincidence.

When actuated the shutdown system releases the safety rods, scramming the reactor, decreasing the sodium flow and tripping the turbine throttle.

Prior to reaching the shutdown set point, the above signals actuate the control rod insertion system. The insertion circuit is a preventive shutdown system. When receiving signals of an abnormal condition the rods will be inserted into the reactor, thereby attempting to alleviate the trouble condition and prevent a shutdown.

The following table offers details of the reactor described above and in the drawings.

TABLE

| | |
|---|---|
| Power | 1110 thermal megawatts.<br>400 gross el. megawatts.<br>370 net el. megawatts. |
| Core | right cylinder 8.4 ft. diameter x 10 ft. height. |
| Moderator | beryllium, 14 ft. height, including 2 ft. blanket—reflector at each end. |
| Blanket | radial blanket 2 ft. thick consisting of graphite moderator and 300 tons of Th breeder rods which are sodium cooled. |
| Fuel | 9,200 kg. (total) of Th=U (7 wt. percent) alloy 644 kg. U-233. |
| Fuel element | Pin type. |
| Number of elements in core | 388. |
| Dimensions of fuel element | 640 pins in 10 ft. element. |
| No. of pins per row | 4. |
| Diameter of pin | 0.26 in. O.D. |
| Cladding | 0.005 in., Type 304 stainless steel. |
| Side plates | 0.04 in. stainless steel. |
| Dimensions of active section of elements | 4 in. x 4 in. x 10 ft. |
| Distance between pins in each row | 1 in. |
| Distance between outside pin and side frame | ½ in. |
| Distance between rows of pins | ¾ in. |
| Be unit cell | 4.47 in. square. |
| Central channel | 4 x 4 in. square. |
| Central element data: | |
| Central fuel element power | 4950 kw. |
| Pressure drop across element | 30 p.s.i. |
| Maximum sodium velocity | 18 ft./sec. |
| Primary sodium flow | $24.9 \times 10^6$ lbs./hr. |
| Bulk coolant outlet temperature | 1050° F. |
| Coolant inlet temperature | 550° F. |
| Sodium loops | 5 primary.<br>5 secondary. |
| Sodium flow (each loop primary and secondary) | 11,700 g.p.m. |
| Main sodium line | 20 in. stainless steel. |
| Intermediate heat exchanger: | |
| Na outlet temperature | 1020° F. |
| Na inlet temperature | 520° F. |
| Secondary sodium flow | $24.9 \times 10^9$ lbs/hr. |
| Steam conditions | 850 p.s.i.g., 900° F. |
| Feedwater | 377° F. |
| Steam flow through superheater | 3,438,000 lbs./hr. |

Physics

| | |
|---|---|
| Neutron economy (per 100 neutrons produced): | |
| Absorption in U-233 | 44.4 (eta~2.25). |
| Absorption in Th | 46.1. |
| Absorption in S.S. | 3.0. |
| Absorption in Be | 1.3. |
| Absorption in Na | 3.2. |
| Absorption in C | 1.0. |
| Leakage from blanket | 1.0. |
| Breeding ratio | 1.04. |
| Median fission energy | 100 ev. |
| Control absorbing material | Europium. |
| Control rod worth | 1.5% Δk. per element. |
| Total control | 18% Δk. |

We claim:

1. A thorium power breeder reactor comprising a vessel, a core within said vessel, said core containing a solid moderator matrix, said moderator being selected from the class consisting of carbon and beryllium, said moderator defining a plurality of fuel element channels, a plurality of fuel elements supported within said channels, each of said fuel elements containing thorium-232 and uranium-233 as the fissionable fuel, means for passing a liquid metal coolant through said channels, means for protecting said moderator from contact with said coolant, reflector means surrounding said core and consisting of said moderator and a plurality of thorium-232 rods disposed therein, said coolant and said moderator being present in sufficient quantity to provide a neutron spectrum in said core having a mean energy of from about 1 to about $10^5$ ev., said thorium-232 being converted to uranium-233 by said neutron spectrum.

2. The power breeder reactor of claim 1 in which said moderator is beryllium occupying about 20 percent of the volume of said core.

3. The power breeder reactor of claim 2 wherein said reflector means surrounding said core contains about 10 volume percent thorium, and the balance said moderator.

4. The power breeder reactor of claim 1 wherein said moderator is beryllium occupying 20 percent of the volume of said core, said coolant is sodium, and said neutron spectrum has a mean energy of about 100 ev.

References Cited by the Examiner

UNITED STATES PATENTS

| | | | |
|---|---|---|---|
| 2,992,174 | 7/61 | Edlund et al. | 176—18 |
| 2,993,850 | 7/61 | Soodak et al. | 176—17 |

OTHER REFERENCES

Electrical Engineering, April 1954, vol. 73, pp. 331–335.

BNL–2390, USAEC Publication, Office of Technical Services, Washington, D.C., pp. 1, 2.

BNL–325, USAEC Publication, Superintendent of Documents, U.S. Gov't. Printing Office, Washington, D.C., pp. 312, 313, 340, 341, July 1, 1958.

Glasstone: Principles of Nuclear Reactor Engineering, Van Nostrand, pp. 736, 737, 1955.

Kesselring: AEC Document KAPL–M–KAK–9, dated May 31, 1950, declassified Feb. 23, 1957, 309 pages, pages 21, 22, and 35 relied upon, Office of Technical Services, Dept. of Commerce, Washington, D.C.

CARL D. QUARFORTH, *Primary Examiner.*

ROGER L. CAMPBELL, REUBEN EPSTEIN
*Examiners.*